(12) United States Patent
Chen

(10) Patent No.: US 8,233,224 B2
(45) Date of Patent: Jul. 31, 2012

(54) IMAGING LENS SYSTEM

(75) Inventor: Chun-Shan Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 288 days.

(21) Appl. No.: 12/654,912

(22) Filed: Jan. 8, 2010

(65) Prior Publication Data

US 2011/0013069 A1 Jan. 20, 2011

(30) Foreign Application Priority Data

Jul. 14, 2009 (TW) ................................ 98123694 A

(51) Int. Cl.
*G02B 9/60* (2006.01)
*G02B 13/18* (2006.01)

(52) U.S. Cl. ................ 359/764; 359/763; 359/714
(58) Field of Classification Search .......... 359/763–764, 359/754–757, 771–773, 776–778, 713–714
See application file for complete search history.

(56) References Cited

U.S. PATENT DOCUMENTS

| 2001/0015856 A1* | 8/2001 | Yoneyama | ..................... 359/687 |
| 2009/0122423 A1* | 5/2009 | Park et al. | ..................... 359/764 |
| 2010/0220229 A1* | 9/2010 | Sano | ..................... 348/340 |

\* cited by examiner

*Primary Examiner* — Jordan Schwartz
(74) *Attorney, Agent, or Firm* — Bacon & Thomas, PLLC

(57) ABSTRACT

This invention provides an imaging lens system including, in order from an object side to an image side: a first lens with positive refractive power having a convex object-side surface; a second lens with negative refractive power; a third lens having a concave image-side surface; a fourth lens with positive refractive power; a fifth lens with negative refractive power having a concave image-side surface, at least one surface thereof having at least one inflection point; and an aperture stop disposed between an imaged object and the third lens. The on-axis spacing between the first lens and second lens is T12, the focal length of the imaging lens system is f, and they satisfy the relation: $0.5<(T12/f) \times 100 < 15$.

27 Claims, 13 Drawing Sheets

TABLE 1

(Embodiment 1)

f = 5.44 mm, Fno = 2.9, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.295 | | | | |
| 2 | Lens 1 | 1.54469 (ASP) | 0.544 | Plastic | 1.544 | 55.9 | 3.85 |
| 3 | | 5.13230 (ASP) | 0.070 | | | | |
| 4 | Lens 2 | 285.35120 (ASP) | 0.300 | Plastic | 1.632 | 23.4 | -8.18 |
| 5 | | 5.07630 (ASP) | 0.408 | | | | |
| 6 | Lens 3 | 2.37564 (ASP) | 0.277 | Plastic | 1.544 | 55.9 | -97.98 |
| 7 | | 2.18085 (ASP) | 0.861 | | | | |
| 8 | Lens4 | -1.60878 (ASP) | 0.492 | Plastic | 1.544 | 55.9 | 7.29 |
| 9 | | -1.26807 (ASP) | 0.100 | | | | |
| 10 | Lens5 | 3.00470 (ASP) | 0.644 | Plastic | 1.544 | 55.9 | -9.2 |
| 11 | | 1.73617 (ASP) | 1.000 | | | | |
| 12 | IR-filter | Plano | 0.300 | Glass | 1.517 | 64.2 | - |
| 13 | | Plano | 0.975 | | | | |
| 14 | Image | Plano | | | | | |

Fig.7

TABLE 2

| | Aspheric Coefficients | | | | |
|---|---|---|---|---|---|
| Surface # | 2 | 3 | 4 | 5 | 6 |
| k = | 2.14772E-01 | -1.00000E+00 | 3.63116E+04 | 8.10223E+00 | -1.00000E+00 |
| A4 = | -1.31489E-02 | -8.93237E-02 | -1.04367E-02 | 5.70855E-02 | -1.01292E-01 |
| A6 = | -1.47658E-02 | 2.01551E-02 | 9.85187E-02 | 1.43963E-01 | -2.43027E-02 |
| A8 = | -5.67815E-03 | 3.53580E-02 | -3.99988E-02 | -1.41282E-01 | 8.35451E-03 |
| A10= | 2.51805E-03 | -3.83556E-02 | 2.33400E-02 | 1.01047E-01 | -1.95940E-03 |
| A12= | -2.21901E-02 | | | | -8.61299E-03 |
| A14= | | | | | 1.80139E-03 |
| A16= | | | | | -7.42997E-04 |
| Surface # | 7 | 8 | 9 | 10 | 11 |
| k = | -1.00000E+00 | -1.00000E+00 | -1.00000E+00 | -1.87192E+01 | -9.57921E+00 |
| A4 = | -7.49611E-02 | 6.76904E-02 | 7.92341E-02 | -3.40218E-02 | -4.40404E-02 |
| A6 = | -2.73159E-02 | -2.41658E-02 | -2.37275E-02 | 5.54721E-03 | 9.60671E-03 |
| A8 = | 1.38402E-02 | -5.78439E-03 | 5.08192E-03 | -3.22066E-04 | -2.02313E-03 |
| A10= | -6.47005E-03 | 8.16669E-03 | 1.03756E-03 | -1.52799E-05 | 2.30078E-04 |
| A12= | | -3.48727E-03 | -4.41160E-04 | | -9.93068E-06 |
| A14= | | | | | -2.91448E-07 |

Fig.8

TABLE 3

(Embodiment 2)

f = 5.46 mm, Fno = 2.9, HFOV = 33.0 deg.

| Surface # |  | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.251 | | | | |
| 2 | Lens 1 | 1.63182 (ASP) | 0.555 | Plastic | 1.544 | 55.9 | 3.85 |
| 3 | | 6.51830 (ASP) | 0.070 | | | | |
| 4 | Lens 2 | 100.00000 (ASP) | 0.300 | Plastic | 1.632 | 23.4 | -7.55 |
| 5 | | 4.54780 (ASP) | 0.411 | | | | |
| 6 | Lens 3 | 2.62599 (ASP) | 0.326 | Plastic | 1.632 | 23.4 | 52.09 |
| 7 | | 2.71644 (ASP) | 0.817 | | | | |
| 8 | Lens4 | -1.25296 (ASP) | 0.401 | Plastic | 1.544 | 55.9 | 13.72 |
| 9 | | -1.19387 (ASP) | 0.100 | | | | |
| 10 | Lens5 | 2.85295 (ASP) | 0.738 | Plastic | 1.544 | 55.9 | -15.02 |
| 11 | | 1.92197 (ASP) | 1.000 | | | | |
| 12 | IR-filter | Plano | 0.300 | Glass | 1.517 | 64.2 | - |
| 13 | | Plano | 0.953 | | | | |
| 14 | Image | Plano | | | | | |

Fig.9

TABLE 4

Aspheric Coefficients

| Surface # | 2 | 3 | 4 | 5 | 6 |
|---|---|---|---|---|---|
| k = | 1.83520E-01 | -1.00000E+00 | -1.00000E+00 | 1.75322E+01 | -1.00000E+00 |
| A4 = | -2.19906E-02 | -9.46773E-02 | -2.35168E-04 | 4.30045E-02 | -8.07699E-02 |
| A6 = | -7.91364E-03 | 6.75602E-03 | 7.60931E-02 | 8.85976E-02 | -7.48881E-03 |
| A8 = | -3.74236E-02 | 2.76996E-03 | -3.97230E-02 | -7.08086E-02 | -2.20195E-02 |
| A10= | 1.58336E-02 | -1.23943E-02 | 2.93922E-02 | 2.61251E-02 | 3.54907E-02 |
| A12 = | -2.19436E-02 | | | | -2.45503E-02 |
| A14 = | | | | | 1.71430E-03 |
| A16 = | | | | | -8.61338E-04 |

| Surface # | 7 | 8 | 9 | 10 | 11 |
|---|---|---|---|---|---|
| k = | -1.00000E+00 | -1.00000E+00 | -1.00000E+00 | -1.57576E+01 | -1.16295E+01 |
| A4 = | -5.94929E-02 | 1.43139E-01 | 1.22717E-01 | -3.39031E-02 | -4.10434E-02 |
| A6 = | -3.56226E-02 | -4.97493E-02 | -1.62014E-02 | 1.03873E-02 | 9.73370E-03 |
| A8 = | 2.31795E-02 | -1.03685E-02 | 2.20416E-03 | -1.57303E-03 | -1.96225E-03 |
| A10= | -1.05164E-02 | 1.15780E-02 | -8.47082E-04 | 7.18402E-05 | 2.28257E-04 |
| A12= | | -3.81329E-03 | 8.10332E-05 | | -1.25631E-05 |
| A14= | | | | | -1.45241E-07 |

Fig.10

TABLE 5

(Embodiment 3)

f = 5.47 mm, Fno = 2.90, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.251 | | | | |
| 2 | Lens 1 | 1.59122 (ASP) | 0.554 | Plastic | 1.544 | 55.9 | 3.76 |
| 3 | | 6.27730 (ASP) | 0.050 | | | | |
| 4 | Lens 2 | 95.15520 (ASP) | 0.300 | Plastic | 1.632 | 23.4 | -7.19 |
| 5 | | 4.32910 (ASP) | 0.459 | | | | |
| 6 | Lens 3 | 2.66560 (ASP) | 0.327 | Plastic | 1.632 | 23.4 | 68.14 |
| 7 | | 2.70650 (ASP) | 0.810 | | | | |
| 8 | Lens4 | -1.28622 (ASP) | 0.395 | Plastic | 1.544 | 55.9 | 14.70 |
| 9 | | -1.22799 (ASP) | 0.100 | | | | |
| 10 | Lens5 | 2.61083 (ASP) | 0.733 | Plastic | 1.530 | 55.8 | -17.37 |
| 11 | | 1.83624 (ASP) | 1.000 | | | | |
| 12 | IR-filter | Plano | 0.300 | Glass | 1.517 | 64.2 | - |
| 13 | | Plano | 0.942 | | | | |
| 14 | Image | Plano | | | | | |

Fig.11

TABLE 6

| Aspheric Coefficients | | | | | |
|---|---|---|---|---|---|
| Surface # | 2 | 3 | 4 | 5 | 6 |
| k = | 2.09651E-01 | -1.00000E+00 | -1.00000E+00 | 9.99772E+00 | -1.00000E+00 |
| A4 = | -1.77930E-02 | -8.72936E-02 | -9.52488E-04 | 4.97902E-02 | -8.71676E-02 |
| A6 = | -1.49198E-02 | 1.18932E-02 | 8.64198E-02 | 1.02616E-01 | -1.22907E-02 |
| A8 = | -2.16321E-02 | 2.19445E-02 | -1.97815E-02 | -6.24973E-02 | -2.13884E-02 |
| A10= | 5.06499E-03 | -3.50593E-02 | 7.13718E-03 | 3.79381E-02 | 3.41199E-02 |
| A12 = | -2.28246E-02 | | | | -2.09784E-02 |
| A14 = | | | | | 2.29279E-03 |
| A16 = | | | | | -8.61338E-04 |
| Surface # | 7 | 8 | 9 | 10 | 11 |
| k = | -1.00000E+00 | -1.00000E+00 | -1.00000E+00 | -1.30015E+01 | -1.01574E+01 |
| A4 = | -6.14819E-02 | 1.59512E-01 | 1.25998E-01 | -3.70522E-02 | -4.15102E-02 |
| A6 = | -4.04836E-02 | -5.11615E-02 | -1.57374E-02 | 1.02084E-02 | 9.52140E-03 |
| A8 = | 2.31102E-02 | -1.19922E-02 | 1.57246E-03 | -1.26222E-03 | -1.93210E-03 |
| A10= | -8.57116E-03 | 1.23102E-02 | -1.30371E-03 | 2.99868E-05 | 2.22574E-04 |
| A12= | | -4.30806E-03 | 1.91832E-04 | | -9.32854E-06 |
| A14= | | | | | -5.31861E-07 |

Fig.12

TABLE 7

|  | Embodiment 1 | Embodiment 2 | Embodiment 3 |
|---|---|---|---|
| f | 5.44 | 5.46 | 5.47 |
| Fno | 2.9 | 2.9 | 2.9 |
| HFOV | 33.0 | 33.0 | 33.0 |
| V1-V2 | 32.5 | 32.5 | 32.5 |
| \|V2-V3\| | 32.5 | 0.0 | 0.0 |
| f/f1 | 1.41 | 1.42 | 1.45 |
| f4/f5 | -0.79 | -0.91 | -0.85 |
| R1/f | 0.28 | 0.30 | 0.29 |
| R4/f | 0.93 | 0.83 | 0.79 |
| Ro/Ri | 1.09 | 0.97 | 0.98 |
|  | 1.27 | 1.05 | 1.05 |
|  | 1.73 | 1.48 | 1.42 |
| (T12/f)*100 | 1.29 | 1.28 | 0.91 |
| TTL/ImgH | 1.66 | 1.66 | 1.66 |

Fig.13

IMAGING LENS SYSTEM

BACKGROUND OF THE INVENTION

1. Field of the Invention

The present invention relates to an imaging lens system, and more particularly, to an imaging lens system used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional compact lens assembly for mobile phone cameras, such as the four lens element assembly disclosed in U.S. Pat. No. 7,365,920, generally comprises four lens elements. However, the four-element lens has become insufficient for a high-end imaging lens assembly due to the rapid increase in the resolution of mobile phone cameras, the reduction in the pixel size of sensors and the increasing demand for compact lens assemblies featuring better image quality. As there is an ongoing trend toward compact yet powerful electronic products, a need exists in the art for an imaging lens system applicable to high-resolution mobile phone cameras while maintaining a moderate total track length.

SUMMARY OF THE INVENTION

The present invention provides an imaging lens system including, in order from the object side to the image side: a first lens element with positive refractive power having a convex object-side surface; a second lens element with negative refractive power; a third lens element having a concave image-side surface; a fourth lens element with positive refractive power; a fifth lens element with negative refractive power having a concave image-side surface, at least one surface thereof being provided with at least one inflection point; and an aperture stop disposed between an imaged object and the third lens element; wherein the on-axis spacing between the first lens element and the second lens element is T12, the focal length of the imaging lens system is f, and they satisfy the relation: $0.5<(T12/f)\times 100<15$.

Such an arrangement of optical elements can effectively correct the aberrations to improve image quality of the system, reduce the total track length of the imaging lens system and achieve a wide field of view.

In the aforementioned imaging lens system, the first lens element provides a positive refractive power, and the aperture stop is disposed near the object side of the imaging lens system, thereby the total track length of the imaging lens system can be reduced effectively. The aforementioned arrangement also enables the exit pupil of the imaging lens system to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the inflection point provided on the fifth lens element can effectively reduce the angle at which the light is projected onto the sensor from the off-axis field so that the off-axis aberrations can be further corrected. In addition, when the aperture stop is disposed near the third lens element, a wide field of view can be favorably achieved. Such an aperture stop placement facilitates the correction of the distortion and chromatic aberration of magnification, thereby the sensitivity of the imaging lens system can be effectively reduced. In other words, when the aperture stop is disposed near the imaged object, the telecentric feature is emphasized and enables a shorter total track length. When the aperture stop is disposed near the third lens element, the emphasis is on the wide field of view so that the sensitivity of the imaging lens system can be effectively reduced.

The present invention provides another imaging lens system including, in order from the object side to the image side: a first lens element with positive refractive power having a convex object-side surface; a second lens element with negative refractive power; a third lens element with negative refractive power; a fourth lens element with positive refractive power having a concave object-side surface and a convex image-side surface; a fifth lens element with negative refractive power having a concave image-side surface, at least one surface thereof being provided with at least one inflection point; and an aperture stop disposed between an imaged object and the third lens element; wherein the on-axis spacing between the first lens element and the second lens element is T12, the focal length of the imaging lens system is f, and they satisfy the relation: $0.5<(T12/f)\times 100<15$.

In the aforementioned imaging lens system, the third lens element has negative refractive power so that the Petzval Sum of the system can be effectively corrected, enabling the focal plane to become more flat near the periphery; the fourth lens element has a concave object-side surface and a convex image-side surface so that the astigmatism of the system can be effectively corrected. Moreover, when the aperture stop is disposed near the object side, the telecentric feature is emphasized and enables a shorter total track length. When the aperture stop is disposed near the third lens element, the emphasis is on the wide field of view so that the sensitivity of the imaging lens system can be effectively reduced.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the data of the respective embodiments resulted from the equations.

DETAILED DESCRIPTION OF THE PREFERRED EMBODIMENTS

Figure 1:
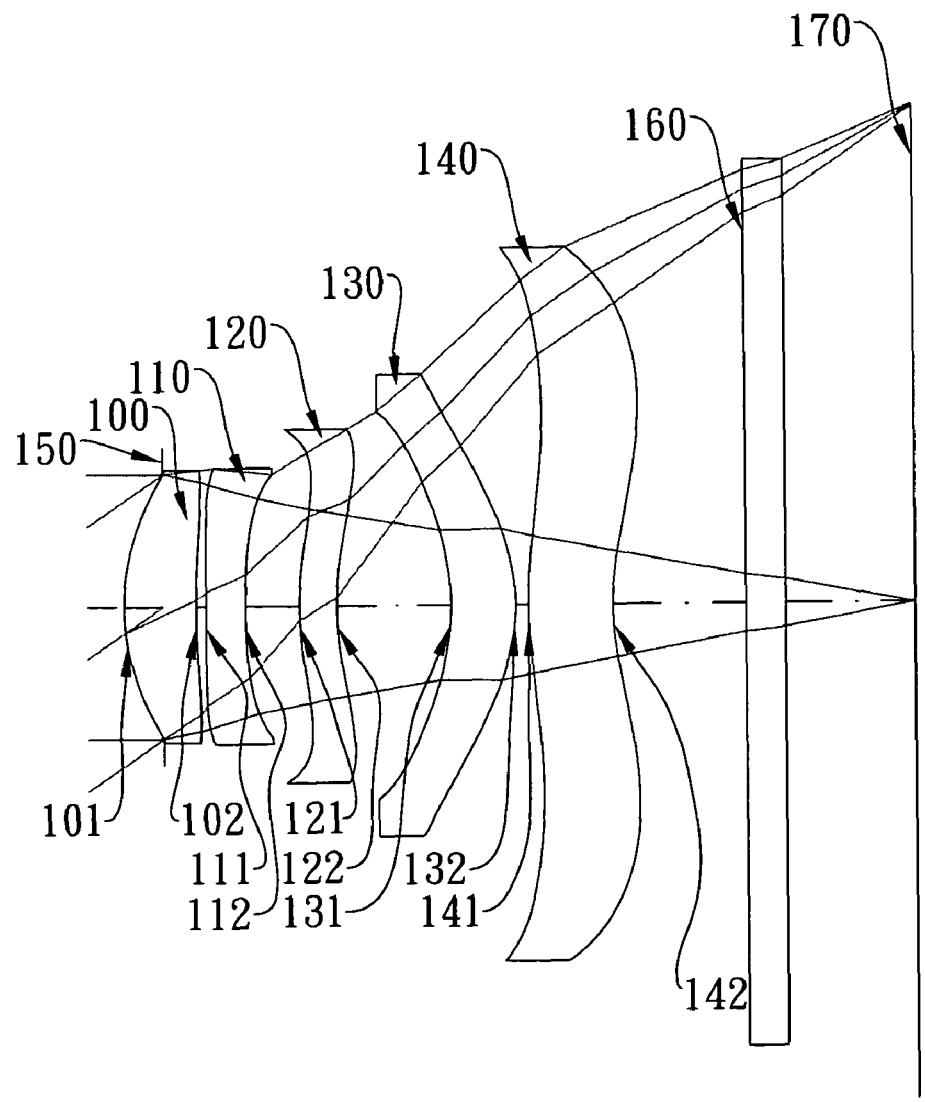
FIG. 1 shows an imaging lens system in accordance with a first embodiment of the present invention.

The present invention provides an imaging lens system including, in order from the object side to the image side: a first lens element with positive refractive power having a convex object-side surface; a second lens element with negative refractive power; a third lens element having a concave image-side surface; a fourth lens element with positive refractive power; a fifth lens element with negative refractive power having a concave image-side surface, at least one surface thereof being provided with at least one inflection point; and an aperture stop disposed between an imaged object and the third lens element; wherein the on-axis spacing between the first lens element and the second lens element is T12, the focal length of the imaging lens system is f, and they satisfy the relation: $0.5<(T12/f)\times 100<15$.

In the aforementioned imaging lens system, the first lens element has positive refractive power and a convex object-side surface so that the total track length of the imaging lens system can be effectively reduced; the second lens element has negative refractive power so that the chromatic aberration of the system can be favorably corrected; the third lens element may be a lens element with either negative or positive refractive power; the fourth lens element has positive refractive power so that the positive refractive power of the first lens element can be effectively distributed to reduce the sensitivity of the imaging lens system; the fifth lens element with negative refractive power and the fourth lens element with positive refractive power form a telephoto structure, thereby the total track length of the imaging lens system can be effectively reduced. When the third lens element has negative refractive power, the Petzval Sum of the system can be more effectively corrected, enabling the focal plane to become more flat near the periphery. When the third lens element has positive refractive power, the high order aberrations of the system can be favorably corrected.

In the aforementioned imaging lens system, the on-axis spacing between the first lens element and the second lens element is T12, the focal length of the imaging lens system is f, and they satisfy the relation: $0.5<(T12/f)\times 100<15$. The above relation can prevent the astigmatism from becoming too large.

In the aforementioned imaging lens system, it is preferable that the second lens element has a concave image-side surface so as to effectively lengthen the back focal length of the imaging lens system, thereby providing sufficient space between the fifth lens element and the image plane to accommodate other components.

In the aforementioned imaging lens system, it is preferable that the third lens element has a convex object-side surface so that the high order aberrations of the system can be favorably corrected to improve the image quality. Preferably, the fourth lens element has a concave object-side surface and a convex image-side surface so that the astigmatism of the system can be effectively corrected.

In the aforementioned imaging lens system, the Abbe number of the first lens element is V1, the Abbe number of the second lens element is V2, and they preferably satisfy the relation: $V1-V2>20$, thereby the chromatic aberration can be effectively corrected. And it will be more preferable that V1 and V2 satisfy the relation: $V1-V2>30$.

In the aforementioned imaging lens system, the focal length of the imaging lens system is f, the focal length of the first lens element is f1 and they preferably satisfy the relation: $1.0<f/f1<1.8$. When the above relation is satisfied, the refractive power of the first lens element is more balanced so that the total track length of the system can be effectively reduced. The above relation also prevents the high order spherical aberration from becoming too large, so that the image quality can be improved. And it will be more preferable that f and f1 satisfy the relation: $1.2<f/f1<1.6$.

In the aforementioned imaging lens system, the focal length of the fourth lens element is f4, the focal length of the fifth lens element is f5, and they preferably satisfy the relation: $-1.5<f4/f5<-0.5$. The above relation ensures the telephoto structure formed by the fourth and fifth lens elements and facilitates reducing the total track length of the system.

In the aforementioned imaging lens system, it is preferable that, of the third, fourth and fifth lens elements, all lens elements which are meniscus in shape satisfy the relation: $0.5<R_o/R_i<2.0$, wherein $R_o$ represents the radius of curvature of the object-side surface of the meniscus lens element and $R_i$ represents the radius of curvature of the image-side surface of the meniscus lens element. The above relation effectively reduces the sensitivity of the system by preventing the refractive power of the meniscus lens elements from becoming too large.

In the aforementioned imaging lens system, the radius of curvature of the object-side surface of the first lens element is R1, the focal length of the imaging lens system is f, and they preferably satisfy the relation: $0.2<R1/f<0.4$. When the above relation is satisfied, the total track length of the imaging lens system can be effectively reduced. The above relation also prevents the high order aberrations from becoming too large.

In the aforementioned imaging lens system, the aperture stop is disposed between the imaged object and the first lens element so that the telecentric feature is emphasized, resulting in a shorter total track length.

The aforementioned imaging lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: $TTL/ImgH<2.0$. The above relation enables the imaging lens system to maintain a compact form so that it can be equipped in compact portable electronic products.

In the aforementioned imaging lens system, the radius of curvature of the image-side surface of the second lens element is R4, the focal length of the imaging lens system is f, and they preferably satisfy the relation: $0.7<R4/f<1.2$. When the above relation is satisfied, the chromatic aberration of the system can be effectively corrected. The above relation also prevents the back focal length of the imaging lens system from becoming too long so that the system can maintain a compact form.

In the aforementioned imaging lens system, the Abbe number of the second lens element is V2, the Abbe number of the third lens element is V3, and they preferably satisfy the relation: $|V2-V3|<15$, thereby the chromatic aberration of the system can be effectively corrected.

The present invention provides another imaging lens system including, in order from the object side to the image side: a first lens element with positive refractive power having a convex object-side surface; a second lens element with negative refractive power; a third lens element with negative refractive power; a fourth lens element with positive refractive power having a concave object-side surface and a convex image-side surface; a fifth lens element with negative refractive power having a concave image-side surface, at least one surface thereof being provided with at least one inflection point; and an aperture stop disposed between an imaged object and the third lens element; wherein the on-axis spacing between the first lens element and the second lens element is T12, the focal length of the imaging lens system is f, and they satisfy the relation: 0.5<(T12/f)×100<15.

In the aforementioned imaging lens system, the first lens element has positive refractive power and a convex object-side surface so that the total track length of the imaging lens system can be effectively reduced; the second lens element has negative refractive power so that the chromatic aberration of the system can be favorably corrected; the third lens element has negative refractive power so that the Petzval Sum of the system can be more effectively corrected, enabling the focal plane to become more flat near the periphery; the fourth lens element has positive refractive power so that the positive refractive power of the first lens element can be effectively distributed to reduce the sensitivity of the imaging lens system, and the concave object-side surface and the convex image-side surface thereof facilitate the correction of the astigmatism of the system; the fifth lens element with negative refractive power and the fourth lens element with positive refractive power form a telephoto structure, thereby the total track length of the imaging lens system can be effectively reduced.

In the aforementioned imaging lens system, the on-axis spacing between the first lens element and the second lens element is T12, the focal length of the imaging lens system is f, and they satisfy the relation: 0.5<(T12/f)×100<15. The above relation can prevent the astigmatism from becoming too large.

In the aforementioned imaging lens system, it is preferable that the second lens element has a concave image-side surface so as to effectively lengthen the back focal length of the imaging lens system, thereby providing sufficient space between the fifth lens element and the image plane to accommodate other components.

In the aforementioned imaging lens system, it is preferable that the third lens element has a convex object-side surface and a concave image-side surface so that the high order aberrations of the system can be favorably corrected to improve the image quality.

In the aforementioned imaging lens system, the Abbe number of the first lens element is V1, the Abbe number of the second lens element is V2, and they preferably satisfy the relation: V1−V2>30, thereby the chromatic aberration can be effectively corrected.

In the aforementioned imaging lens system, the focal length of the imaging lens system is f, the focal length of the first lens element is f1, and they preferably satisfy the relation: 1.0<f/f1<1.8. When the above relation is satisfied, the refractive power of the first lens element is more balanced so that the total track length of the system can be effectively reduced. The above relation also prevents the high order spherical aberration from becoming too large, so that the image quality can be improved. And it will be more preferable that f and f1 satisfy the relation: 1.2<f/f1<1.6.

In the aforementioned imaging lens system, the focal length of the fourth lens element is f4, the focal length of the fifth lens element is f5, and they preferably satisfy the relation: −1.5<f4/f5<−0.5. The above relation ensures the telephoto structure formed by the fourth and fifth lens elements and facilitates reducing the total track length of the system.

In the aforementioned imaging lens system, it is preferable that, of the third, fourth and fifth lens elements, all lens elements which are meniscus in shape satisfy the relation: $0.5<R_o/R_i<2.0$, wherein $R_o$ represents the radius of curvature of the object-side surface of the meniscus lens element and $R_i$ represents the radius of curvature of the image-side surface of the meniscus lens element. The above relation effectively reduces the sensitivity of the system by preventing the refractive power of the meniscus lens elements from becoming too large.

In the aforementioned imaging lens system, the radius of curvature of the object-side surface of the first lens element is R1, the focal length of the imaging lens system is f, and they preferably satisfy the relation: 0.2<R1/f<0.4. When the above relation is satisfied, the total track length of the imaging lens system can be effectively reduced. The above relation also prevents the high order aberrations from becoming too large.

In the aforementioned imaging lens system, the aperture stop is disposed between the imaged object and the first lens element so that the telecentric feature is emphasized, resulting in a shorter total track length.

The aforementioned imaging lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<2.0. The above relation enables the imaging lens system to maintain a compact form so that it can be equipped in compact portable electronic products.

In the present imaging lens system, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens system can be reduced effectively.

In the present imaging lens system, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
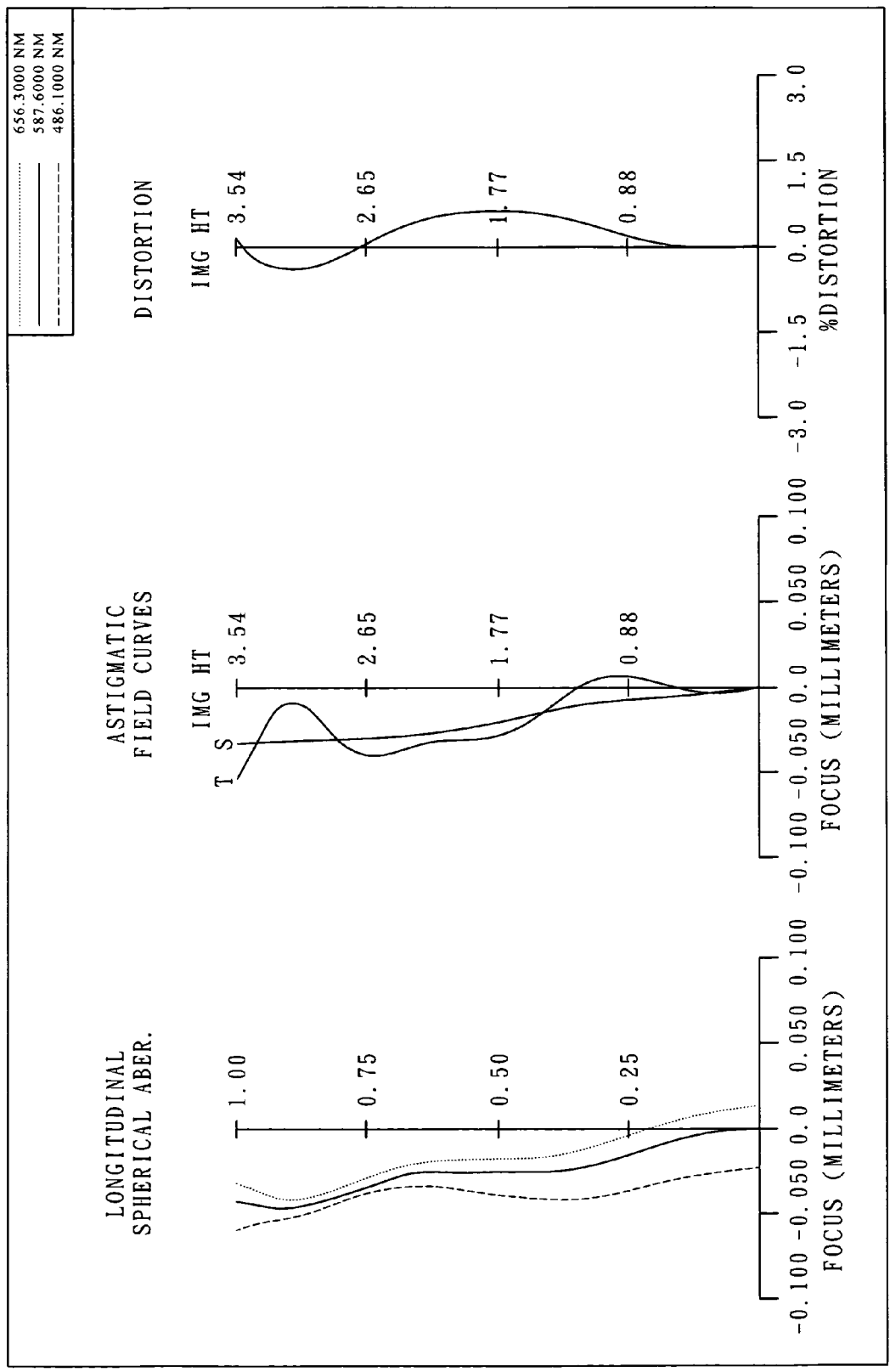
FIG. 2 shows the aberration curves of the first embodiment of the present invention.

FIG. 1 shows an imaging lens system in accordance with a first embodiment of the present invention, and FIG. 2 shows the aberration curves of the first embodiment of the present invention. The imaging lens system of the first embodiment of the present invention mainly comprises five lens elements including, in order from the object side to the image side: a plastic first lens element 100 with positive refractive power having a convex object-side surface 101 and a concave image-side surface 102, the object-side and image-side surfaces 101 and 102 thereof being aspheric; a plastic second lens element 110 with negative refractive power having a convex object-side surface 111 and a concave image-side surface 112, the object-side and image-side surfaces 111 and 112 thereof being aspheric; a plastic third lens element 120 with negative refractive power having a convex object-side surface 121 and a concave image-side surface 122, the object-side and image-side surfaces 121 and 122 thereof being aspheric; a plastic fourth lens element 130 with positive refractive power having a concave object-side surface 131 and a convex image-side surface 132, the object-side and image-side surfaces 131 and 132 thereof being aspheric; and a plastic fifth lens element 140 with negative refractive power having a convex object-side surface 141 and a concave image-side surface 142, the object-side and image-side surfaces 141 and 142 thereof being aspheric, and each of which being provided with at least one inflection point; wherein an aperture stop 150 is disposed between an imaged object and the first lens element 100; wherein the imaging lens system further comprises an IR filter 160 disposed between the image-side surface 142 of the fifth lens element 140 and the image plane 170; and wherein the IR filter 160 has no influence on the focal length of the imaging lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens system, the focal length of the imaging lens system is f, and it satisfies the relation: f=5.44.

In the first embodiment of the present imaging lens system, the f-number of the imaging lens system is Fno, and it satisfies the relation: Fno=2.9.

In the first embodiment of the present imaging lens system, half of the field of view of the imaging lens system is HFOV, and it satisfies the relation: HFOV=33.0 degrees.

In the first embodiment of the present imaging lens system, the on-axis spacing between the first lens element 100 and the second lens element 110 is T12, the focal length of the imaging lens system is f, and they satisfy the relation: (T12/f)×100=1.29.

In the first embodiment of the present imaging lens system, the Abbe number of the first lens element 100 is V1, the Abbe number of the second lens element 110 is V2, and they satisfy the relation: V1−V2=32.5.

In the first embodiment of the present imaging lens system, the focal length of the imaging lens system is f, the focal length of the first lens element 100 is f1, and they satisfy the relation: f/f1=1.41.

In the first embodiment of the present imaging lens system, the focal length of the fourth lens element 130 is f4, the focal length of the fifth lens element 140 is f5, and they satisfy the relation: f4/f5=−0.79.

In the first embodiment of the present imaging lens system, each of the third lens element 120, the fourth lens element 130 and the fifth lens element 140 is a meniscus lens element, wherein $R_o$ represents the radius of curvature of the object-side surface of the meniscus lens element, $R_i$ represents the radius of curvature of the image-side surface of the meniscus lens element, and they satisfy the relations:

$R_o/R_i$=1.09 (the third lens element 120), $R_o/R_i$=1.27 (the fourth lens element 130), $R_o/R_i$=1.73 (the fifth lens element 140).

In the first embodiment of the present imaging lens system, the radius of curvature of the object-side surface 101 of the first lens element 100 is R1, the focal length of the imaging lens system is f, and they satisfy the relation: R1/f=0.28.

In the first embodiment of the present imaging lens system, an electronic sensor on the image plane 170 is provided for the image formation of the imaged object. The distance on the optical axis between the object-side surface 101 of the first lens element 100 and the electronic sensor is TTL, half of the diagonal length of the effective pixel area of the electronic sensor is ImgH, and they satisfy the relation: TTL/ImgH=1.66.

In the first embodiment of the present imaging lens system, the radius of curvature of the image-side surface 112 of the second lens element 110 is R4, the focal length of the imaging lens system is f, and they satisfy the relation: R4/f=0.93.

In the first embodiment of the present imaging lens system, the Abbe number of the second lens element 110 is V2, the Abbe number of the third lens element 120 is V3, and they satisfy the relation: |V2−V3|=32.5.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 3:
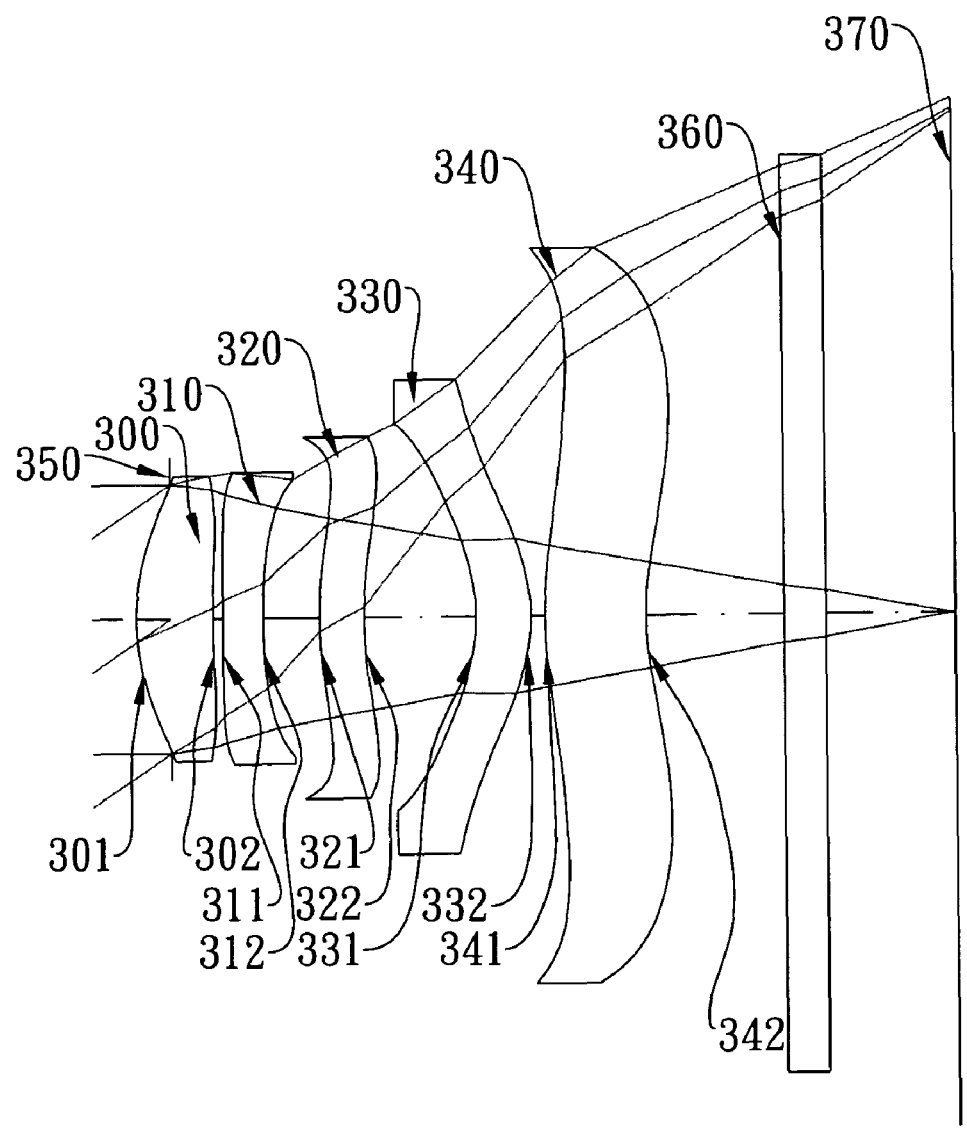
FIG. 3 shows an imaging lens system in accordance with a second embodiment of the present invention.
Figure 4:
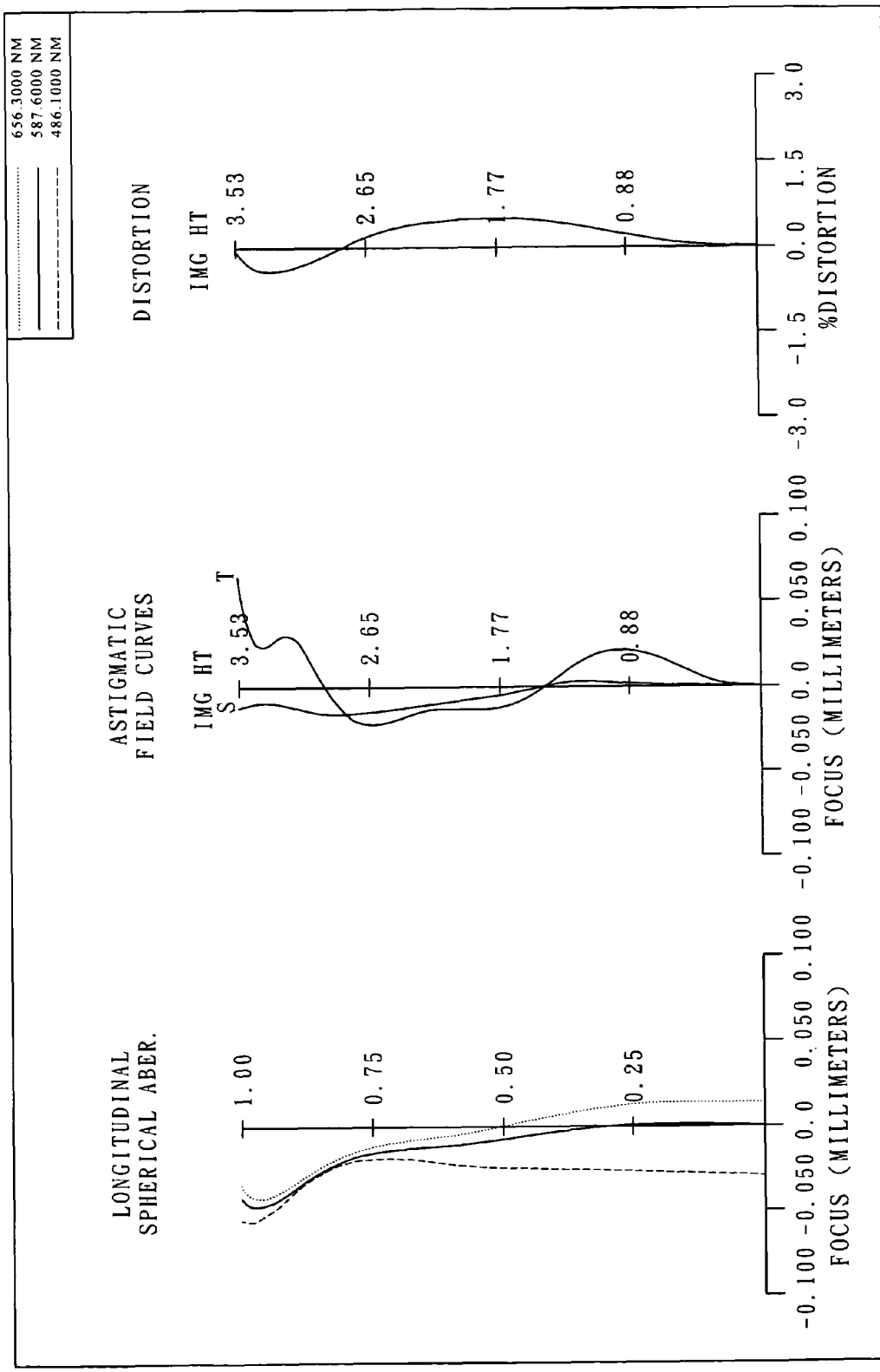
FIG. 4 shows the aberration curves of the second embodiment of the present invention.

FIG. 3 shows an imaging lens system in accordance with a second embodiment of the present invention, and FIG. 4 shows the aberration curves of the second embodiment of the present invention. The imaging lens system of the second embodiment of the present invention mainly comprises five lens elements including, in order from the object side to the image side: a plastic first lens element 300 with positive refractive power having a convex object-side surface 301 and a concave image-side surface 302, the object-side and image-side surfaces 301 and 302 thereof being aspheric; a plastic second lens element 310 with negative refractive power having a convex object-side surface 311 and a concave image-side surface 312, the object-side and image-side surfaces 311 and 312 thereof being aspheric; a plastic third lens element 320 with positive refractive power having a convex object-side surface 321 and a concave image-side surface 322, the object-side and image-side surfaces 321 and 322 thereof being aspheric; a plastic fourth lens element 330 with positive refractive power having a concave object-side surface 331 and a convex image-side surface 332, the object-side and image-side surfaces 331 and 332 thereof being aspheric; and a plastic fifth lens element 340 with negative refractive power having a convex object-side surface 341 and a concave image-side surface 342, the object-side and image-side surfaces 341 and 342 thereof being aspheric, and each of which being provided with at least one inflection point; wherein an aperture stop 350 is disposed between an imaged object and the first lens element 300; wherein the imaging lens system further comprises an IR filter 360 disposed between the image-side surface 342 of the fifth lens element 340 and the image plane 370; and wherein the IR filter 360 has no influence on the focal length of the imaging lens system.

The equation of the aspheric surface profiles of the second embodiment has the same format as that of the first embodiment.

In the second embodiment of the present imaging lens system, the focal length of the imaging lens system is f, and it satisfies the relation: f=5.46.

In the second embodiment of the present imaging lens system, the f-number of the imaging lens system is Fno, and it satisfies the relation: Fno=2.9.

In the second embodiment of the present imaging lens system, half of the field of view of the imaging lens system is HFOV, and it satisfies the relation: HFOV=33.0 degrees.

In the second embodiment of the present imaging lens system, the on-axis spacing between the first lens element 300 and the second lens element 310 is T12, the focal length of the imaging lens system is f, and they satisfy the relation: (T12/f)×100=1.28.

In the second embodiment of the present imaging lens system, the Abbe number of the first lens element 300 is V1, the Abbe number of the second lens element 310 is V2, and they satisfy the relation: V1−V2=32.5.

In the second embodiment of the present imaging lens system, the focal length of the imaging lens system is f, the focal length of the first lens element 300 is f1, and they satisfy the relation: f/f1=1.42.

In the second embodiment of the present imaging lens system, the focal length of the fourth lens element 330 is f4, the focal length of the fifth lens element 340 is f5, and they satisfy the relation: f4/f5=−0.91.

In the second embodiment of the present imaging lens system, each of the third lens element 320, the fourth lens element 330 and the fifth lens element 340 is a meniscus lens element, wherein $R_o$ represents the radius of curvature of the object-side surface of the meniscus lens element, $R_i$ represents the radius of curvature of the image-side surface of the meniscus lens element, and they satisfy the relations:

$R_o/R_i$=0.97 (the third lens element 320), $R_o/R_i$=1.05 (the fourth lens element 330), $R_o/R_i$=1.48 (the fifth lens element 340).

In the second embodiment of the present imaging lens system, the radius of curvature of the object-side surface 301 of the first lens element 300 is R1, the focal length of the imaging lens system is f, and they satisfy the relation: R1/f=0.30.

In the second embodiment of the present imaging lens system, an electronic sensor on the image plane 370 is provided for the image formation of the imaged object. The distance on the optical axis between the object-side surface 301 of the first lens element 300 and the electronic sensor is TTL, half of the diagonal length of the effective pixel area of the electronic sensor is ImgH, and they satisfy the relation: TTL/ImgH=1.66.

In the second embodiment of the present imaging lens system, the radius of curvature of the image-side surface 312 of the second lens element 310 is R4, the focal length of the imaging lens system is f, and they satisfy the relation: R4/f=0.83.

In the second embodiment of the present imaging lens system, the Abbe number of the second lens element 310 is V2, the Abbe number of the third lens element 320 is V3, and they satisfy the relation: |V2−V3|=0.0.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 5:
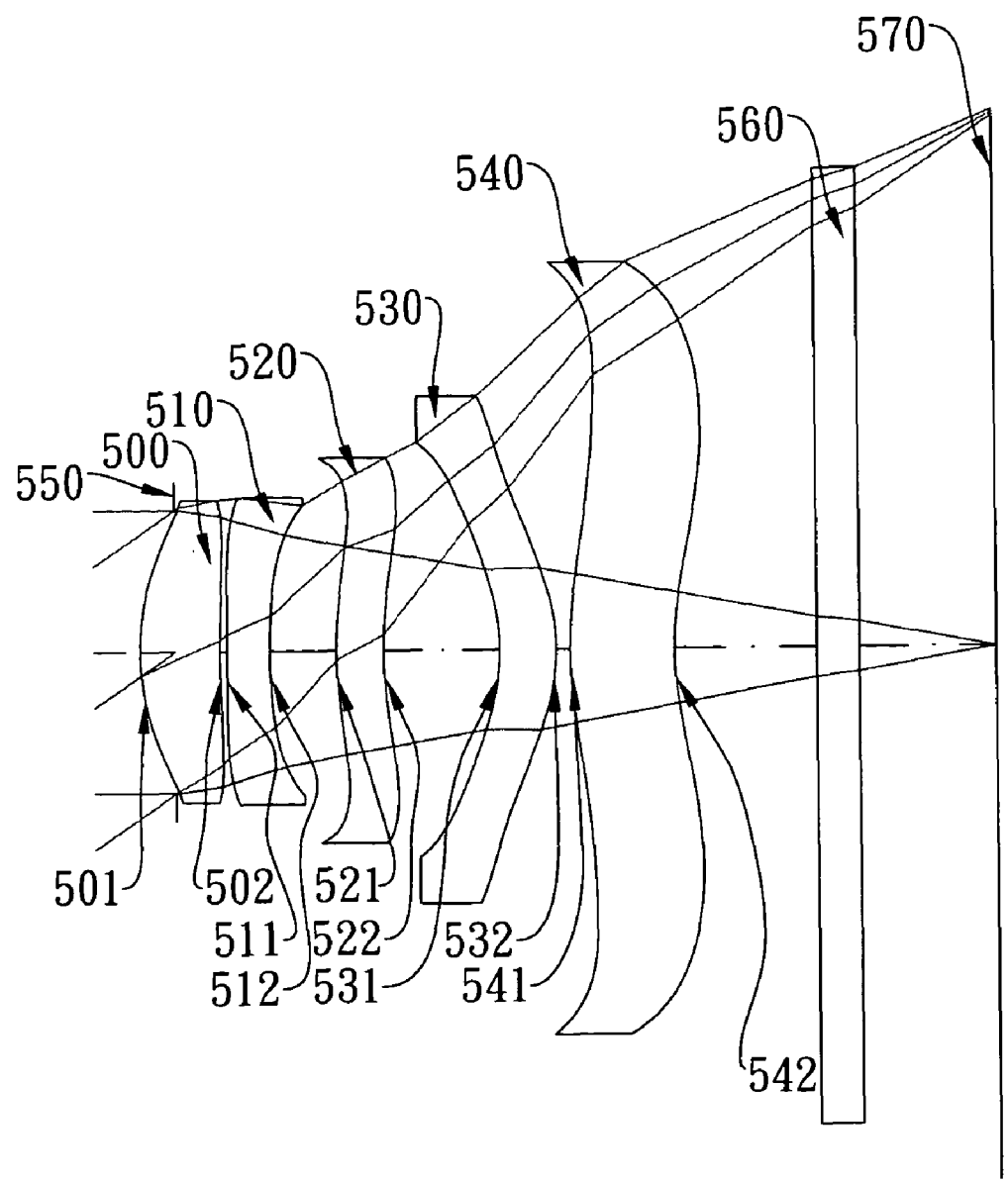
FIG. 5 shows an imaging lens system in accordance with a third embodiment of the present invention.
Figure 6:
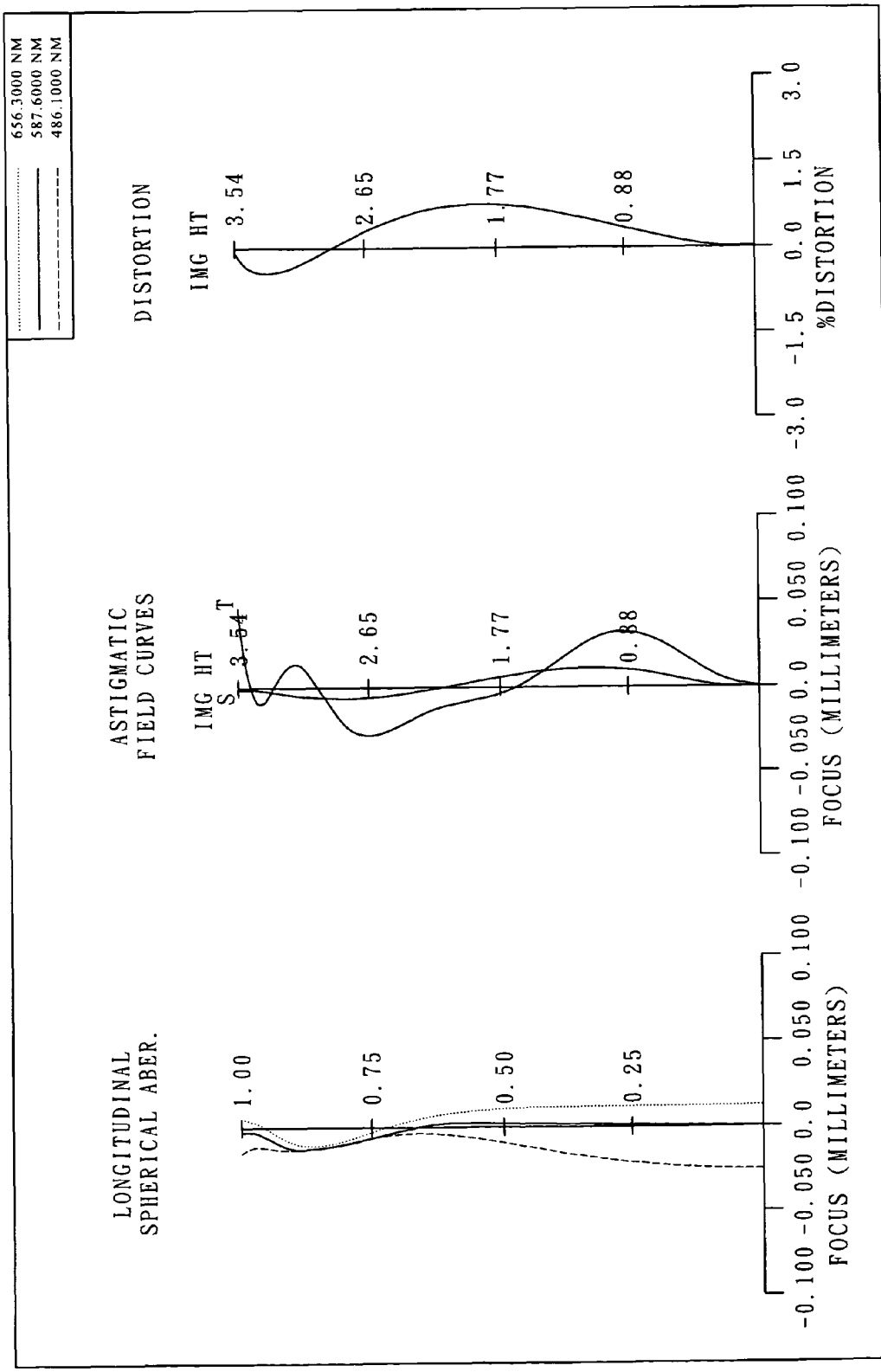
FIG. 6 shows the aberration curves of the third embodiment of the present invention.

FIG. 5 shows an imaging lens system in accordance with a third embodiment of the present invention, and FIG. 6 shows the aberration curves of the third embodiment of the present invention. The imaging lens system of the third embodiment of the present invention mainly comprises five lens elements including, in order from the object side to the image side: a plastic first lens element 500 with positive refractive power having a convex object-side surface 501 and a concave image-side surface 502, the object-side and image-side surfaces 501 and 502 thereof being aspheric; a plastic second lens element 510 with negative refractive power having a convex object-side surface 511 and a concave image-side surface 512, the object-side and image-side surfaces 511 and 512 thereof being aspheric; a plastic third lens element 520 with positive refractive power having a convex object-side surface 521 and a concave image-side surface 522, the object-side and image-side surfaces 521 and 522 thereof being aspheric; a plastic fourth lens element 530 with positive refractive power having a concave object-side surface 531 and a convex image-side surface 532, the object-side and image-side surfaces 531 and 532 thereof being aspheric; and a plastic fifth lens element 540 with negative refractive power having a convex object-side surface 541 and a concave image-side surface 542, the object-side and image-side surfaces 541 and 542 thereof being aspheric, and each of which being provided with at least one inflection point; wherein an aperture stop 550 is disposed between an imaged object and the first lens element 500; wherein the imaging lens system further comprises an IR filter 560 disposed between the image-side surface 542 of the fifth lens element 540 and the image plane 570; and wherein the IR filter 560 has no influence on the focal length of the imaging lens system.

The equation of the aspheric surface profiles of the third embodiment has the same format as that of the first embodiment.

In the third embodiment of the present imaging lens system, the focal length of the imaging lens system is f, and it satisfies the relation: f=5.47.

In the third embodiment of the present imaging lens system, the f-number of the imaging lens system is Fno, and it satisfies the relation: Fno=2.9.

In the third embodiment of the present imaging lens system, half of the field of view of the imaging lens system is HFOV, and it satisfies the relation: HFOV=33.0 degrees.

In the third embodiment of the present imaging lens system, the on-axis spacing between the first lens element 500 and the second lens element 510 is T12, the focal length of the imaging lens system is f, and they satisfy the relation: (T12/f)×100=0.91.

In the third embodiment of the present imaging lens system, the Abbe number of the first lens element 500 is V1, the Abbe number of the second lens element 510 is V2, and they satisfy the relation: V1−V2=32.5.

In the third embodiment of the present imaging lens system, the focal length of the imaging lens system is f, the focal length of the first lens element 500 is f1, and they satisfy the relation: f/f1=1.45.

In the third embodiment of the present imaging lens system, the focal length of the fourth lens element 530 is f4, the focal length of the fifth lens element 540 is f5, and they satisfy the relation: f4/f5=−0.85.

In the third embodiment of the present imaging lens system, each of the third lens element 520, the fourth lens element 530 and the fifth lens element 540 is a meniscus lens element, wherein $R_o$ represents the radius of curvature of the object-side surface of the meniscus lens element, $R_i$ represents the radius of curvature of the image-side surface of the meniscus lens element, and they satisfy the relations:

$R_o/R_i$=0.98 (the third lens element 520), $R_o/R_i$=1.05 (the fourth lens element 530), $R_o/R_i$=1.42 (the fifth lens element 540).

In the third embodiment of the present imaging lens system, the radius of curvature of the object-side surface 501 of the first lens element 500 is R1, the focal length of the imaging lens system is f, and they satisfy the relation: R1/f=0.29.

In the third embodiment of the present imaging lens system, an electronic sensor on the image plane 570 is provided for the image formation of the imaged object. The distance on the optical axis between the object-side surface 501 of the first lens element 500 and the electronic sensor is TTL, half of the diagonal length of the effective pixel area of the electronic sensor is ImgH, and they satisfy the relation: TTL/ImgH=1.66.

In the third embodiment of the present imaging lens system, the radius of curvature of the image-side surface 512 of the second lens element 510 is R4, the focal length of the imaging lens system is f, and they satisfy the relation: R4/f=0.79.

In the third embodiment of the present imaging lens system, the Abbe number of the second lens element 510 is V2, the Abbe number of the third lens element 520 is V3, and they satisfy the relation: |V2−V3|=0.0.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

It is to be noted that TABLES 1-6 (illustrated in FIGS. 7-12 respectively) show different data of the different embodiments, however, the data of the different embodiments are obtained from experiments. Therefore, any imaging lens system of the same structure is considered to be within the scope of the present invention even if it uses different data. The preferred embodiments depicted above are exemplary and are not intended to limit the scope of the present invention. TABLE 7 (illustrated in FIG. 13) shows the data of the respective embodiments resulted from the equations.

What is claimed is:

1. An imaging lens system including, in order from an object side to an image side:
    a first lens element with positive refractive power having a convex object-side surface;
    a second lens element with negative refractive power;
    a third lens element having a concave image-side surface;
    a fourth lens element with positive refractive power;
    a fifth lens element with negative refractive power having a concave image-side surface, at least one surface thereof being provided with at least one inflection point; and
    an aperture stop disposed between an imaged object and the third lens element;
    wherein an on-axis spacing between the first lens element and the second lens element is T12, a focal length of the imaging lens system is f, an Abbe number of the second lens element is V2, an Abbe number of the third lens element is V3, and T12, f, V2, and V3 satisfy the relations: 0.5<(T12/f)×100<15; and |V2−V3 |<15.

2. The imaging lens system according to claim 1, wherein the second lens element has a concave image-side surface.

3. The imaging lens system according to claim 2, wherein the third lens element has a convex object-side surface while the fourth lens element has a concave object-side surface and a convex image-side surface.

4. The imaging lens system according to claim 3, wherein the third lens element has positive refractive power.

5. The imaging lens system according to claim 2, wherein an Abbe number of the first lens element is V1, an Abbe number of the second lens element is V2, and they satisfy the relation: V1−V2>20.

6. The imaging lens system according to claim 5, wherein the Abbe number of the first lens element is V1, the Abbe number of the second lens element is V2, and they
    satisfy the relation: V1−V2>30.

7. The imaging lens system according to claim 2, wherein a focal length of the first lens element is f1 and the f and f1 satisfy the relation: 1.0<f/f1<1.8.

8. The imaging lens system according to claim 7, wherein f and f1 satisfy the relation: 1.2<f/f1<1.6.

9. The imaging lens system according to claim 2, wherein the lens elements with refractive power are limited to the first, second, third, fourth and fifth lens elements.

10. The imaging lens system according to claim 9, wherein a focal length of the fourth lens element is f4, a focal length of the fifth lens element is f5, and they satisfy the relation: −1.5<f4/f5<−0.5.

11. The imaging lens system according to claim 9, wherein at least one of the third, fourth and fifth lens elements is meniscus in shape, and wherein, of the third, fourth and fifth lens elements, all lens elements which are meniscus in shape satisfy the relation: $0.5 < R_o/R_i < 2.0$, wherein $R_o$ represents a radius of curvature of an object-side surface of the meniscus lens element and $R_i$ represents a radius of curvature of an image-side surface of the meniscus lens element.

12. The imaging lens system according to claim 1, wherein a radius of curvature of the object-side surface of the first lens element is R1 and they and f and R1 satisfy the relation: 0.2<R1/f<0.4.

13. The imaging lens system according to claim 2, wherein the aperture stop is disposed between the imaged object and the first lens element.

14. The imaging lens system according to claim 9 further comprising an electronic sensor for object imaging, wherein an on-axis spacing between the object-side surface of the first lens element and the electronic sensor is TTL, half of the diagonal length of the effective pixel area of the electronic sensor is ImgH, and they satisfy the relation: TTL/ImgH<2.0.

15. The imaging lens system according to claim 2, wherein a radius of curvature of the image-side surface of the second lens element is R4 and f and R4 satisfy the relation: 0.7<R4/f<1.2.

16. An imaging lens system including, in order from an object side to an image side:
    a first lens element with positive refractive power having a convex object-side surface;
    a second lens element with negative refractive power;
    a third lens element with negative refractive power;
    a fourth lens element with positive refractive power having a concave object-side surface and a convex image-side surface;
    a fifth lens element with negative refractive power having a concave image-side surface, at least one surface thereof being provided with at least one inflection point; and
    an aperture stop disposed between an imaged object and the third lens element;
    wherein an on-axis spacing between the first lens element and the second lens element is T12, a focal length of the imaging lens system is f and T12 and f satisfy the relation: 0.5<(T12/f)×100<15.

17. The imaging lens system according to claim 16, wherein the second lens element has a concave image-side surface.

18. The imaging lens system according to claim 17, wherein the third lens element has a convex object-side surface and a concave image-side surface.

19. The imaging lens system according to claim 17, wherein an Abbe number of the first lens element is V1, an Abbe number of the second lens element is V2, and they satisfy the relation: V1−V2>30.

20. The imaging lens system according to claim 17, wherein a focal length of the first lens element is f1 and f and f1 satisfy the relation: 1.0<f/f1<1.8.

21. The imaging lens system according to claim 20, wherein f and f1 satisfy the relation: 1.2<f/f1<1.6.

22. The imaging lens system according to claim 17, wherein the lens elements with refractive power are limited to the first, second, third, fourth and fifth lens elements.

23. The imaging lens system according to claim 22, wherein a focal length of the fourth lens element is f4, a focal length of the fifth lens element is f5, and they satisfy the relation: −1.5<f4/f5<−0.5.

24. The imaging lens system according to claim 22, wherein at least one of the third, fourth and fifth lens elements is meniscus in shape, and wherein, of the third, fourth and fifth lens elements, all lens elements which are meniscus in shape satisfy the relation: $0.5<R_o/R_i<2.0$, wherein $R_o$ represents a radius of curvature of an object-side surface of the meniscus lens element and $R_i$ represents a radius of curvature of an image-side surface of the meniscus lens element.

25. The imaging lens system according to claim 16, wherein a radius of curvature of the object-side surface of the first lens element is R1 f and R1 satisfy the relation: 0.2<R1/f<0.4.

26. The imaging lens system according to claim 17, wherein the aperture stop is disposed between the imaged object and the first lens element.

27. The imaging lens system according to claim 22 further comprising an electronic sensor for object imaging, wherein an on-axis spacing between the object-side surface of the first lens element and the electronic sensor is TTL, half of the diagonal length of the effective pixel area of the electronic sensor is ImgH, and they satisfy the relation: TTL/ImgH<2.0.

* * * * *